UNITED STATES PATENT OFFICE.

WALDRON SHAPLEIGH, OF CAMDEN, ASSIGNOR TO THE ELECTRIC STORAGE BATTERY COMPANY, OF GLOUCESTER CITY, NEW JERSEY.

ELECTRODE FOR SECONDARY BATTERIES.

SPECIFICATION forming part of Letters Patent No. 438,116, dated October 7, 1890.

Application filed November 13, 1889. Serial No. 330,222. (No model.)

*To all whom it may concern:*

Be it known that I, WALDRON SHAPLEIGH, a citizen of the United States, residing at Camden, in the county of Camden and State of New Jersey, have invented certain new and useful Improvements in Frames or Supports for the Plates or Elements of Electric Batteries, of which the following is a specification.

My invention relates to frames or supports for the plates or elements of a secondary or storage battery.

The principal object of my invention is to provide a tough, compact, and pure metallic frame or support for a battery plate or element, and in which local action of such framed or supported active plates or elements constituting the battery is obviated.

Heretofore it has been found, when lead is used for the frames or supports of battery plates or elements, that in a short time portions of them become to a greater or less extent peroxidized or "formed" in a similar manner as the battery plates or elements themselves, whereby they are soon eaten through in spots and rendered useless.

My invention consists in overcoming said serious results by adding to the metal or metals—as lead or an alloy of lead, antimony, or mercury—such a quantity of metallic sodium as will purify the metal or alloys by removing the oxygen contained in them. The metallic sodium has, as is well understood, a greater affinity for oxygen than most of the other metals. The addition of the metallic sodium to the metal or metals frees the same of dross or oxides and gives a tough pure metal or alloy as a product. The frames or supports for battery plates or elements formed of the described composition obviates objectionable local actions. In the reduction of the oxide or oxides of the mass or compound the sodium is oxidized and rises to the surface as caustic soda, which may or may not be removed. The product obtained is a pure dense bright metal. The metallic sodium may be introduced directly into the molten mass or compound, or may form an amalgam with mercury when the latter is used; but in most instances, for convenience and from the standpoint of economy, it will be found most desirable to introduce the metallic sodium into the lead alone, or into an alloy of lead, a few moments before casting the mass, in a suitable appliance, into the frame or support for the battery plate or element. A sufficient quantity of metallic sodium is used in each instance to produce a brilliant mirror-like surface on the molten mass, which demonstrates clearly that all oxides of the mass have been reduced to metals by the absorption of their oxygen by the metallic sodium. The caustic soda forming rises to the surface and assists in preventing further reoxidation of the mass.

Instead of introducing metallic sodium into the mass for the purposes described, potassium may be used for producing a similar action upon the metal or metals; but from the standpoint of economy I prefer to use metallic sodium.

The principal advantages derived from the use of a composition having metallic sodium or potassium introduced into the same are that a tough, compact, and pure dense metal is obtained for forming the frames or supports for battery plates or elements, and then the heretofore objectionable local action in the frames or supports of the plates or elements of the battery setting in and causing their destruction in a brief period of time is entirely obviated.

I am aware that previous to my invention it has been proposed to form an electrode of a secondary battery of lead and mercury; and I am also aware that it has been proposed to form a support-plate for a battery-electrode of an alloy of lead, antimony, and mercury, and with the active matter consisting of a metallic salt applied to the support-plate after the latter was formed; and hence I do not claim, broadly, such materials, but simply desire to protect as of my invention the use of a metal or an alloy, and metallic sodium or potassium, for the purposes hereinbefore mentioned.

Having thus described the nature and objects of my invention, what I claim as new, and desire to secure by Letters Patent, is—

As a new article of manufacture, a battery-plate frame or support having the qualities of compactness, purity, and toughness, as described, and formed of deoxidized lead or lead alloy, substantially as and for the purposes set forth.

In witness whereof I have hereunto set my signature in the presence of two subscribing witnesses.

WALDRON SHAPLEIGH.

Witnesses:
GEO. W. REED,
THOMAS M. SMITH.